United States Patent
Aijaz

(10) Patent No.: US 11,129,214 B2
(45) Date of Patent: Sep. 21, 2021

(54) RESOURCE SLICING IN A WIRELESS COMMUNICATION NETWORK

(71) Applicant: Kabushiki Kaisha Toshiba, Minato-ku (JP)

(72) Inventor: Adnan Aijaz, Bristol (GB)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 16/664,319

(22) Filed: Oct. 25, 2019

(65) Prior Publication Data
US 2021/0127437 A1    Apr. 29, 2021

(51) Int. Cl.
| | |
|---|---|
| H04W 40/24 | (2009.01) |
| H04W 76/12 | (2018.01) |
| H04W 48/18 | (2009.01) |
| H04W 16/18 | (2009.01) |
| H04W 28/02 | (2009.01) |

(52) U.S. Cl.
CPC .......... *H04W 76/12* (2018.02); *H04W 16/18* (2013.01); *H04W 28/0268* (2013.01); *H04W 40/248* (2013.01); *H04W 48/18* (2013.01)

(58) Field of Classification Search
CPC ...... H04W 76/12; H04W 16/18; H04W 48/18
USPC ...... 455/414.1, 418, 450, 452.1, 405, 422.1, 455/424, 435.1
See application file for complete search history.

(56) References Cited

U.S. PATENT DOCUMENTS

| | | | |
|---|---|---|---|
| 8,874,125 B2 | 10/2014 | Mahindra et al. | |
| 2008/0225774 A1 | 9/2008 | Kim et al. | |
| 2012/0051296 A1 | 3/2012 | Kokku et al. | |
| 2013/0336206 A1 | 12/2013 | Farhadi | |
| 2017/0034841 A1 | 2/2017 | Bethanabhotla et al. | |
| 2017/0086118 A1 | 3/2017 | Vrzic | |
| 2017/0318468 A1* | 11/2017 | Aijaz | H04W 16/10 |
| 2018/0359337 A1* | 12/2018 | Kodaypak | H04L 43/08 |

FOREIGN PATENT DOCUMENTS

WO    WO 2017/080517 A1    5/2017

OTHER PUBLICATIONS

Ravi Kokku, et al., "NVS: A Substrate for Virtualizing Wireless Resources in Cellular Networks", IEEE/ACM Transactions on Networking, vol. 20, No. 5, Oct. 2012, 14 pages.
Ravi Kokku, et al., "CellSlice: Cellular Wireless Resource Slicing for Active RAN Sharing", IEEE COMSNETS, Jan. 2013, 10 pages.
(Continued)

*Primary Examiner* — Nghi H Ly
(74) *Attorney, Agent, or Firm* — Oblon, McClelland, Maier & Neustadt, L.L.P.

(57) ABSTRACT

A method of resource slicing in a wireless communication network. The communication network includes a device domain, a radio access network and a core network. The device domain includes at least one device and is connected to the radio access network over a wireless interface. The method includes abstracting the device domain, the radio access network and the core network as a plurality of network functions using a slicing controller to provide end-to-end resource slicing. Network functions provide protocol functionality as part of connectivity in the network.

18 Claims, 10 Drawing Sheets

(56) References Cited

OTHER PUBLICATIONS

Mohamad Kalil, et al., "Wireless Resources Virtualization in LTE Systems", 2014 IEEE INFOCOM Workshops on Mobile Cloud Computing, Apr. 2014, 7 pages.
Jun He, et al., "AppRAN: Application-Oriented Radio Access Network Sharing in Mobile Networks", IEEE ICC 2015—Mobile and Wireless Networking Symposium , Jun. 2015, 7 pages.
Gautam Bhanage, et al., "VNTS: A Virtual Network Traffic Shaper for Air Time Fairness in 802.16e Systems", IEEE ICC 2010 proceedings, May 2010, 6 pages.
Liang Zhao, et al., "LTE Virtualization: From Theoretical Gain to Practical Solution", IEEE ITC, Sep. 2011, 8 pages.
GSM Association, "An Introduction to Network Slicing", Nov. 2017, 20 pages.

\* cited by examiner

US 11,129,214 B2

RESOURCE SLICING IN A WIRELESS COMMUNICATION NETWORK

FIELD

Embodiments described herein relate generally to resource slicing in a wireless communication network. More specifically, embodiments relate to end-to-end resource slicing in a wireless communication network.

BACKGROUND

Communication networks of today are expected to support multiple services with diverse requirements. One example of such networks is emerging 5G mobile/cellular networks which are expected to support a range of use-cases across vertical industries. Network slicing is important for achieving design flexibility in such multi-service networks. The fundamental principle of network slicing is to create multiple logical networks over a common physical infrastructure such that each network is tailored to the specific needs of a service/use-case.

In realizing network slicing, network function virtualization (NFV) and software-defined networking (SDN) technologies may play a crucial role.

One example of service-oriented networks is a local 4G/5G cellular network deployed inside factories or warehouses. Network slicing is important in such networks to meet the requirements of different industrial use-cases or applications. State-of-the-art network slicing techniques are mainly focused toward separately slicing radio/wireless resources, the radio access network (RAN) and the core network.

It may be desired to provide end-to-end resource slicing, explicitly taking into account the wireless/radio resources as well as the RAN and the core network, in a wireless communication network.

BRIEF DESCRIPTION OF THE DRAWINGS

In the following, embodiments will be described with reference to the drawings in which.

DETAILED DESCRIPTION

Figure 1:
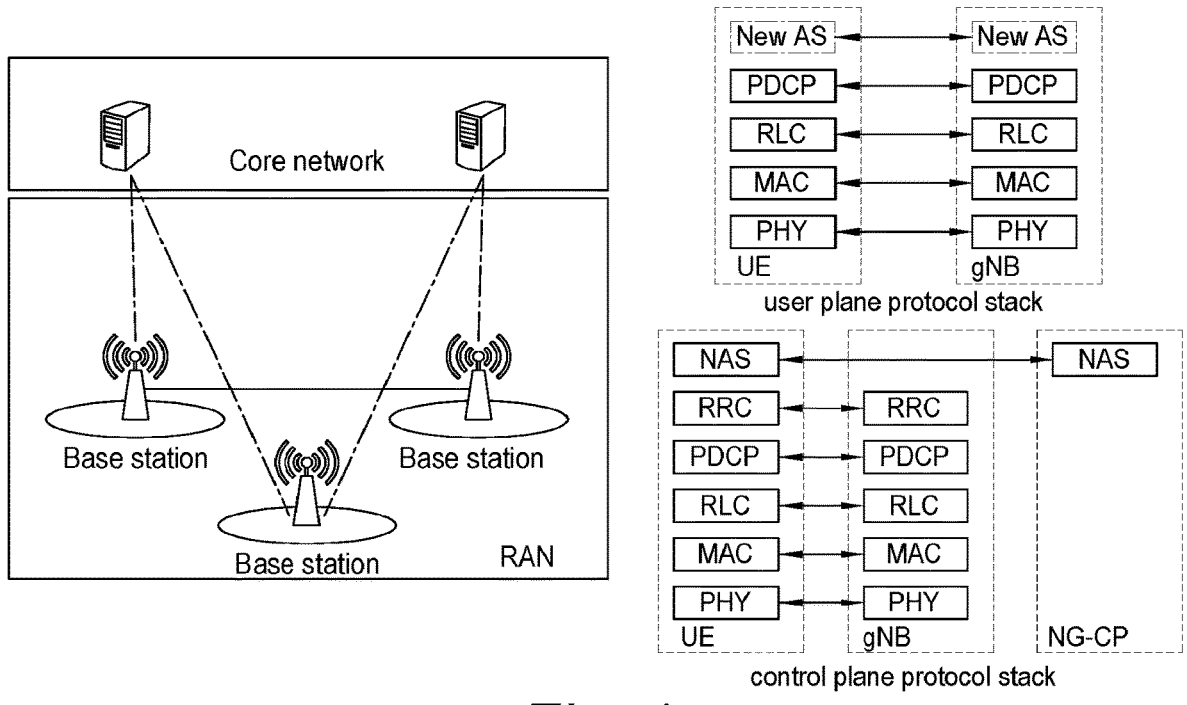
FIG. 1 illustrates a schematic diagram of a 5G architecture and protocol stack.

In an embodiment, there is provided a method of resource slicing in a wireless communication network comprising a device domain, a radio access network and a core network. The device domain comprises at least one device and is connected to the radio access network over a wireless interface. The method comprises abstracting the device domain, the radio access network and the core network as a plurality of network functions using a slicing controller to provide end-to-end resource slicing. Network functions provide protocol functionality as part of connectivity in the network.

In an embodiment the device domain is part of or the totality of the devices connected to the core network via the radio access network.

In an embodiment the core network is a network that uses the radio access network to connect to the devices.

In an embodiment a network entity or a network domain is decomposed into network functions by identifying coarsely-grained basic connectivity functions and then splitting the basic connectivity functions into more finely-grained network functions.

In an embodiment the method further comprises grouping the fine-grained network functions into control-plane and user-plane functions.

In an embodiment the method further comprises abstracting the network into a hierarchy of network functions in a plurality of dimensions.

In an embodiment the method further comprises abstracting the network into a vertical dimension from the device to the core network or vice versa, and/or abstracting the network in a horizontal dimension, across layers of network hierarchy, by traversing layers of protocol stack hierarchy.

In an embodiment the method further comprises abstracting the network in a control-plane dimension and/or a user-plane dimension.

In an embodiment the method further comprises abstracting a wireless interface of the network as a set of sub frames.

In an embodiment the method further comprises synthesizing a slice by selecting and chaining of the plurality of network functions based on service requirements.

In an embodiment a slice is synthesised by service composition using the slicing controller.

In an embodiment the method further comprises synthesizing a slice through chaining of basic connectivity functions in one of a vertical dimension, a horizontal dimension, a control-plane dimension or a user-plane dimension and a directed graph of network functions in a different one of the vertical dimension, the horizontal dimension, the control-plane dimension or the user-plane dimension, wherein the connectivity between basic connectivity functions and the vertices of a directed graph is dictated by protocol-level interaction.

In an embodiment the method further comprises synthesizing a slice through a multi-plane graph, wherein each plane corresponds to a level of network hierarchy.

In an embodiment the method further comprises synthesizing a slice through a directed graph of network functions in a wireless interface, the radio access network and the core network.

In an embodiment the method further comprises synthesizing a common control-plane for all slices of the network such that the directed graph comprises control-plane functions in a wireless interface, the radio access network and the core network, and the graph is traversed as per the hierarchy of the network or the protocol stack hierarchy.

In an embodiment the method further comprises synthesizing the control-plane to provide slice-specific control-plane functionality.

In an embodiment the method further comprises abstracting physical radio resources defined in time and frequency domains such that the physical resources are grouped into resource sets, wherein each resource set is based on slice-specific service requirements and/or service requirements that extend across slices.

In an embodiment each resource set comprises one or more resource blocks.

In an embodiment a resource set comprises a virtual resource set.

In an embodiment a resource block comprises a virtual resource block.

In an embodiment the method further comprises synthesizing the one or more resource sets through adaptation of time and frequency domain resources to serve an application that requires maximised user-data throughput, an application that requires minimising transmission latency or an application that can afford a low user-data transmission rate.

In an embodiment high-rate application is for high data rate applications, such as video streaming.

In an embodiment low-rate application is for low data rate applications, such as industrial monitoring.

In an embodiment the method further comprises mapping a slice over a wireless interface through a virtual data pipe such that the virtual data pipe represents the end points for data transfer between a device and the radio access network, defining slice-specific logical channels and mapping the slice-specific logical channels onto one or more transport channels and further mapping the transport channels onto physical channels.

In an embodiment the method further comprises defining the logical channels to handle user-plane or control-plane information.

In an embodiment the method further comprises multiplexing the logical channels onto the one or more transport channels by assigning priorities to slices.

In an embodiment the method further comprises serving the logical channels in an order dictated by slice priority and a prioritized rate defined for some of the slices.

In an embodiment the method further comprises serving the logical channels in an order dictated by slice priority and a prioritized rate defined for some of the slices.

In an embodiment the method further comprises pairing the physical channels to specific sub-frames over the wireless interface, the sub-frames being abstracted from the wireless interface.

According to another embodiment there is provided a processor based method of abstracting physical radio resources defined in time and frequency domains. The method comprises grouping resources of said physical radio resources into a set, wherein said grouping is configured to fulfil a desired transmission service requirement of a slice and exclusively transmitting data of said slice using said set of grouped resources.

In an embodiment the method further comprises mapping slice specific logical channels onto a shared transport channel and mapping the shared transport channel onto a shared physical channel.

In an embodiment a virtual data pipe is established on the physical transport channel.

In an embodiment a plurality of slice specific logical channels, each associated with at least one of a slice priority or a prioritized rate, are mapped onto the shared transport channel in order of the at least one of associated slice priority or prioritized rate.

In an embodiment a wireless interface is abstracted as a collection of sub-frames.

In an embodiment the physical channels are paired with specific sub-frames over a wireless interface.

According to another embodiment there is provided a wireless communication network comprising a device domain comprising at least one device, a radio access network, a core network, wherein the device domain is connected to the radio access network over a wireless interface, and a slicing controller. The slicing controller is configured to abstract the device domain, the radio access network and the core network as a plurality of network functions to provide end-to-end resource slicing, wherein network functions provide protocol functionality as part of connectivity in the network.

In an embodiment the slicing controller is further configured to decompose a network entity or a network domain into network functions by identifying coarsely-grained basic connectivity functions and then splitting the basic connectivity functions into more finely-grained network functions.

In an embodiment the slicing controller is further configured to abstract the network into a hierarchy of network functions in a plurality of dimensions.

In an embodiment the slicing controller is further configured to synthesize a slice by selecting and chaining of the plurality of network functions based on service requirements.

In an embodiment the slicing controller is further configured to synthesize a slice through chaining of basic connectivity functions in one of a vertical dimension, a horizontal dimension, a control-plane dimension or a user-plane dimension and a directed graph of network functions in a different one of the vertical dimension, the horizontal dimension, the control-plane dimension or the user-plane dimension, wherein the connectivity between basic connectivity functions and the vertices of a directed graph is dictated by protocol-level interaction.

In an embodiment the slicing controller is further configured to synthesize a slice through a multi-plane graph, wherein each plane corresponds to a level of network hierarchy.

In an embodiment the slicing controller is further configured to abstract physical radio resources defined in time and frequency domains such that the physical resources are grouped into resource sets, wherein each resource set is based on slice-specific service requirements and/or service requirements that extend across slices.

In an embodiment the slicing controller is further configured to map a slice over a wireless interface through a virtual data pipe such that the virtual data pipe represents the end points for data transfer between the device and the radio access network, defining slice-specific logical channels and mapping the slice-specific logical channels onto one or more transport channels and further mapping the transport channels onto physical channels.

According to another embodiment there is provided a non-transitory storage medium comprising computer program instructions, the computer program instructions, when executed by a processor, configured to cause the processor to perform the any of the above discussed methods.

Embodiments described herein may provide end-to-end resource slicing in service-oriented networks. This lightweight slicing solution may be deployed in a gateway or an edge-computing node/device.

Embodiments described herein provide a modular and dynamic service composition functionality based on the service requirements of a slice/application.

Embodiments described herein provide a service-to-resource mapping technique that ensures efficient utilization of wireless/radio resources while supporting co-existence of different slices on the air-interface with function-level isolation.

Embodiments described herein are not limited to just mobile/cellular networks (e.g. 4G/5G networks) but may provide end-to-end resource slicing on any other network including Wi-Fi and 6TiSCH networks.

Embodiments described herein provide network slicing able to achieve tight isolation between slices, provide application-specific customization and ensure efficient resource utilization across different slices.

Embodiments provide network slicing techniques that provide improved functional isolation among slices.

Embodiments also provide the foundation for achieving multi-tenancy in wireless networks.

Although the focus of embodiments described is communication resources, the framework and principles can also be extended to slicing of computing and/or caching resources.

Embodiments provide a gateway-level solution, which may be relatively easily integrated into any network without compromising standards-compatibility.

Embodiments may be realized through various open-source tools, which are gaining popularity for 5G mobile/cellular networks.

Structural features of the embodiments include:
a) Function-level Decomposition—Other existing network slicing solutions treat network entities as a collection of tightly coupled network functions. Embodiments separate out tightly coupled network functions into sub-functions through function-level decomposition of network entities. Such sub-functions can be slice-specific or shared among slices.
b) Functional Abstraction—Unlike other existing network slicing techniques, which only abstract wired/wireless resources in a network, embodiments abstract the network as a set of network functions in addition to abstraction of wired/wireless resources.
c) Modular and Dynamic Service Composition—Embodiments create a modular end-to-end service based on the requirements of a slice. Moreover, service composition/re-composition may be changed dynamically.
d) Service-to-Resource Mapping—Embodiments implement service-to-resource mapping which ensures efficient utilization of radio resources while supporting co-existence of different slices on the air-interface with function-level isolation.

FIG. 1 illustrates the architecture and protocol stack of a 5G network, in order to facilitate understanding of embodiments for a 5G network. The 5G network comprises a radio access network (RAN), including a plurality of base stations, and a core network with components connected by a wired interface.

The terminology for the protocol stack layers is as follows: PHY—Physical layer, MAC—Medium access control layer, RLC—Radio link control layer, PDCP—Packet data convergence protocol layer, RRC—Radio resource control layer, NAS—Non-access stratum layer and AS—Access stratum layer. As shown, there may be a user plane protocol stack and a control plane protocol stack.

Embodiments have been designed to provide end-to-end resource slicing in service oriented networks. Such slicing may be logically achieved in an entity located at a higher level in network hierarchy as compared to the base stations or access points in the RAN. In one embodiment, a gateway may be located in a local or a public 5G network such that the gateway comprises a software-defined controller (a slicing controller) which interacts with the RAN and the core network. Such interaction can be realized through controller-agent (two-way) communication over open application programming interfaces (APIs).

Figure 2:
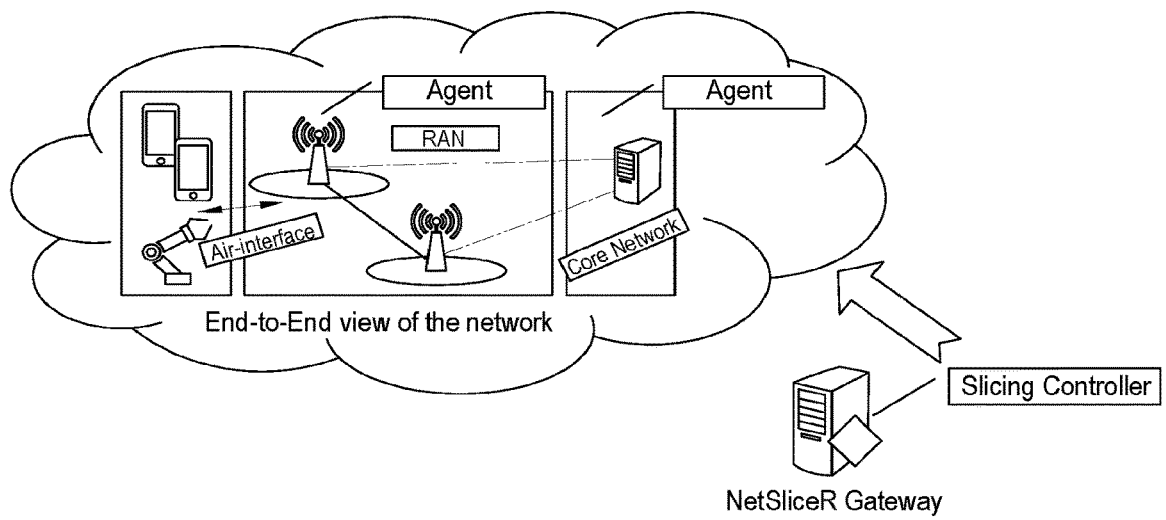
FIG. 2 illustrates a schematic diagram of a gateway according to an embodiment.

FIG. 2 illustrates the concept of a gateway implementing embodiments. The slicing controller is shown which interacts with the RAN and the core network. Communication between devices (e.g. cellular phones, or industrial equipment) and the RAN takes place via an air interface. The devices may be considered to be in a device domain. The device domain is connected to the RAN via the air-interface. The gateway also provides the API to the network owner or service provider for defining the slice requirements.

Function-level Decomposition

Conventionally, wireless networks are treated as a group of independent entities with a priori function placement. Such static function deployment potentially creates barriers for on-demand service delivery. Function-level decomposition allows design flexibility as well as functional isolation between slices, as a slice may consist of a set of network functions placed according to service requirements. A network function is essentially a functional building block of the connectivity service provided by a communication network. Network functions may provide protocol functionality as part of connectivity in the network.

Figure 3:
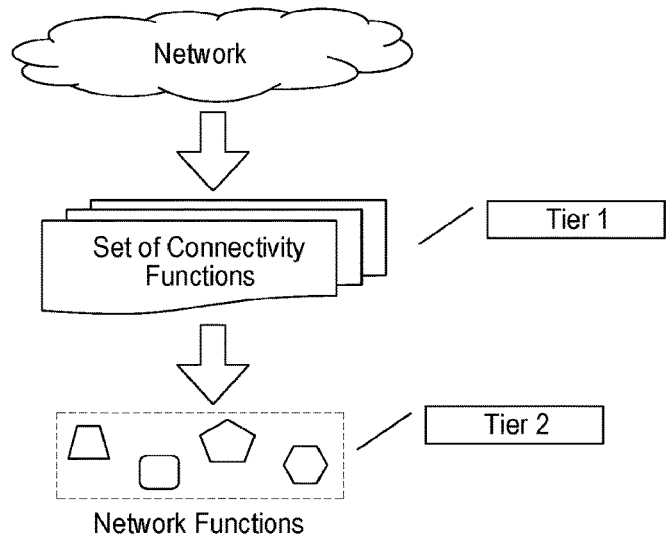
FIG. 3 illustrates a schematic diagram of two-tier function level decomposition according to an embodiment.

FIG. 3 illustrates an embodiment of the implementation of a two-tier approach to function-level decomposition of a network. The first-tier (Tier 1) comprises a basic set of connectivity functions, which provide certain capabilities from a connectivity perspective and are specific to the underlying network. In one embodiment the connectivity functions included in Tier 1 are at least one of a transmission function (which provides the capability of information (control, data, management, etc.) transmission on the air-interface and on any other physical interfaces between the RAN and the core network), a connection function (which provides the capability of establishing and maintaining a connection between a device and the network), a forwarding function (which provides the capability of routing information (data as well as signalling) both inside and outside the network), a mobility function (which provides the capability of handling node/device mobility in the network) or a security function (which provides the capability of secure communication between a device and the network). These functions may be considered coarse-grained network functions. For 5G technology all five of these functions may be combined to form a basic set of connectivity functions.

The second-tier splits the basic set of connectivity functions into control-plane (which handles signalling in the network) and user-plane (which handles data traffic in the network) network functions. Such two-tier function-level decomposition facilitates dynamic service composition with tight functional isolation between slices. The functions are decoupled from network entities, i.e. the RAN and the core network. The functions are split up to be specific to each entity. The above-mentioned Tier 1 connectivity functions may, in one embodiment, be segmented into the following abstracted Tier 2 network functions:

Transmission Function: One or more of modulation, demodulation, multiplexing, de-multiplexing, encoding, decoding, scrambling, de-scrambling, antenna selection, frequency selection, etc. which may be considered to be fine-grained network functions.

Connection Function: One or more of system broadcasts, random access, connection setup/release, attach/detach, paging, etc.

Forwarding Function: One or more of bearer establishment, air-interface channel mapping, tunnelling, configuration of switches and routers, etc.

Mobility Function: One or more of handover, location updates, roaming, etc.

Security Function: One or more of authentication, authorization, encryption, decryption, etc.

The abstracted/Tier 2 network functions may be considered fine-grained network functions. As the network functions are abstracted the functions can be invoked substantially independent of semantics. This provides ease in the slicing controller to assemble a network graph (such as the network graphs shown in any of FIGS. 8 to 14) taking into account only the functions needed for this purpose without limitation by semantics.

The second tier (Tier 2) involves decoupling (i.e. decomposition) of basic connectivity functions into fine-grained network functions at the network-entity level and grouping these into control-plane functions (CPF) and user-plane functions (UPF). This provides flexibility in service/slice composition based on quality-of-service (QoS) requirements. For example, a slice for a low-latency application may include those network functions that are required to provide minimal latency in connectivity. Similarly, a control-plane can be designed in a way so that it commonly applies to all or at least to a plurality of slice or so that it is slice-specific (as explained later). The basic connectivity functions can be spread across the network, for example in the RAN and the core network. In Tier 2, basic connectivity functions are decomposed at the network-entity level, for example in a base station, so that the network function does not extend between network entities. The decoupling and grouping may be carried out by the slicing controller. The slicing controller may reside in a gateway, e.g. as shown in FIG. 2.

Figure 4:
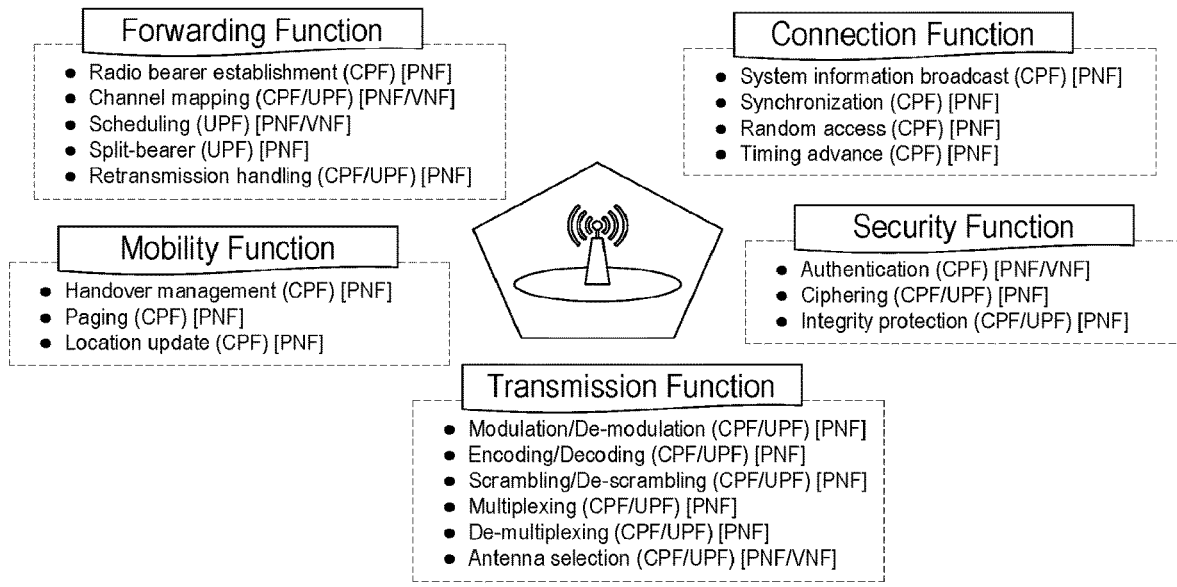
FIG. 4 illustrates a schematic diagram of fine-grained decomposition of basic connectivity functions in a base station according to an embodiment.
Figure 5:
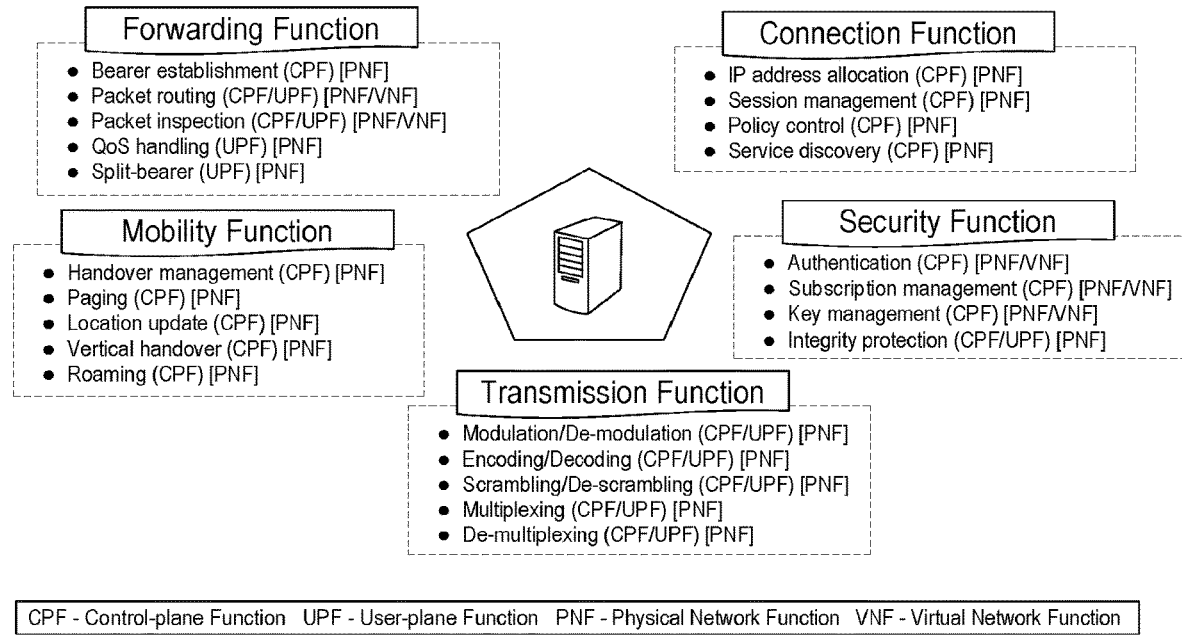
FIG. 5 illustrates a schematic diagram of fine-grained decomposition of basic connectivity functions in a core network according to an embodiment.

FIGS. 4 and 5 illustrate this decoupling and grouping for a base station (RAN) and core network, respectively. In addition to control-plane and user-plane grouping, the fine-grained network functions can also be grouped in terms of physical network functions (PNF) and virtual network functions (VNF). The physical network functions run on dedicated hardware whereas virtual network functions can decoupled from hardware and can run on a shared platforms.

The functions are split across the domains (i.e. the RAN and the core network.) Each of the Tier 2 network functions are presented under the Tier 1 basic connectivity functions, e.g. in FIG. 4, for the Security function (Tier 1), the Tier 2 network functions authentication, ciphering and integrity protection are shown alongside each other. Authentication is grouped into a control-plane function (CPF) and also grouped into physical network functions (PNF) and virtual network functions (VNF). Ciphering and integrity protection are grouped into control-plane functions (CPF) and user-plane functions (UPF) and also grouped into physical network functions (PNF). Similar corresponding groupings are presented for the other Tier 2 network functions under the respective Tier 1 connectivity functions for both the base station (FIG. 4) and the core network (FIG. 5).

Thus, embodiments adopt a function-level decomposition approach that separates out tightly coupled functions from network entities.

Functional Abstraction

Existing network slicing solutions are heavily focused toward abstraction of wired/wireless network resources or network entities. Embodiments implement a 4-dimensional (4D) functional abstraction of the network, which underpins modular and dynamic service composition based on slice and/or application requirements with functional isolation between slices. Such 4D abstraction also provides the capability of fine-grained customization of network functions as per slice/application requirements.

Abstraction minimises the amount of syntax required for instantiating the network function, thereby increasing the ease of calling the abstracted network function and/or incorporating it into a slice. The abstraction may be carried out by a slicing controller. As the connectivity functions are abstracted into network functions the slicing controller can be agnostic regarding the precise structure or components of the network. Furthermore, the abstracted network functions are configured to connect to other/related functions in other domains or parts of the network, irrespective of the structure of the network. The slicing controller can access and abstract resources in the whole network into a plurality of functions for the particular requirement.

In one dimension, the network is abstracted in the vertical (hierarchical) domain. Such hierarchy could be from the device to the core network or vice versa. Such vertical abstraction provides the capability to segregate slices/applications in an end-to-end manner that ultimately leads to simplification from a logical network design perspective.

In the second dimension, the network is abstracted across the network hierarchy, i.e., in the horizontal domain. Such horizontal abstraction provides design simplicity for efficient sharing of network resources across the layers of network connectivity.

In the third dimension, the network is abstracted from a control-plane perspective, creating a set of distributed control plane functions from the underlying connectivity functions. This provides necessary flexibility for common or slice-specific control-plane design.

Finally, in the fourth dimension, the network is abstracted from a user-plane perspective, creating a set of distributed user plane functions from the underlying connectivity functions. This provides the capability of slice-specific customization as per the quality-of-service (QoS) requirements.

Put in other words, in embodiments the connectivity functions are abstracted so that the functionality of individual resulting network functions is limited to a particular vertical domain, a particular part of the network hierarchy and the user plane or control plane.

Figure 6:
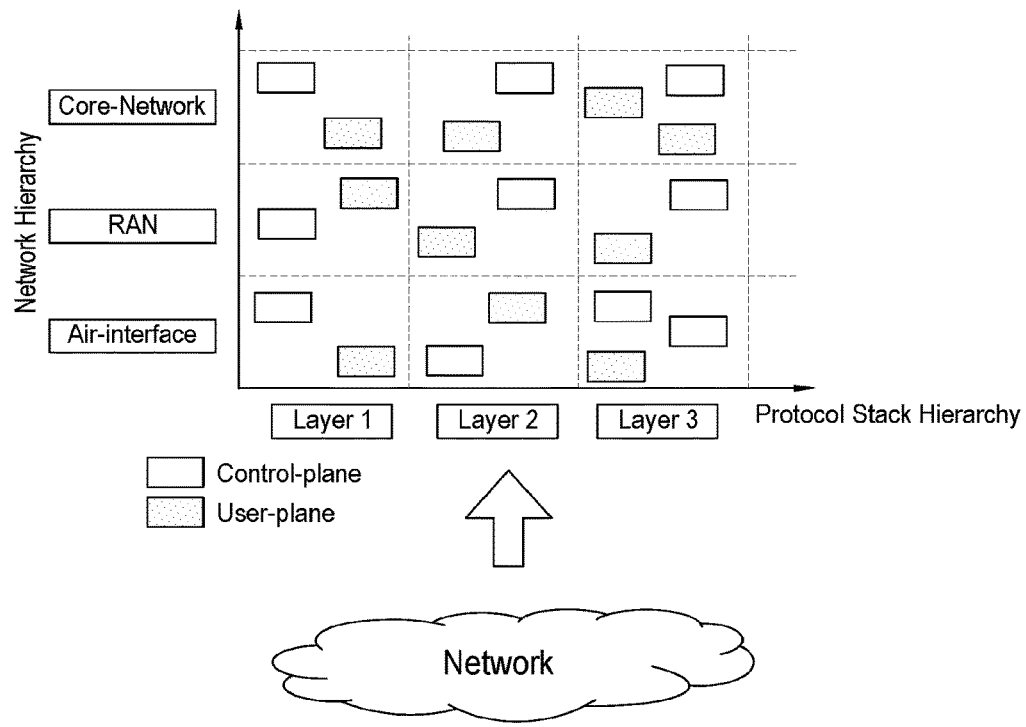
FIG. 6 illustrates a schematic diagram of 2D abstraction of the network in vertical and horizontal domains according to an embodiment.

FIG. 6 shows a 2-dimensional (2D) abstraction of the network in vertical and horizontal dimensions. The boxes show control-plane and user-plane functions across the domains (i.e. the air-interface, the RAN and the core network). Along the vertical dimension, control-plane and user-plane network functions are split in terms of network hierarchy. Along the horizontal dimension, control-plane and user-plane functions are split in terms of protocol stack hierarchy. For example, layers 1, 2 and 3 may correspond to the PHY, MAC and RLC layers as described with reference to FIG. 1. As will be appreciated, each of the network functions indicated by the boxes in FIG. 6 is abstracted such that its functionality is limited to a particular part of the network hierarchy (i.e. the air-interface, RAN or core network in this example) as well as to a particular protocol stack layer and a particular plane (i.e. the user plane or the control plane). In this manner the slicing controller can select a function within each part of the network hierarchy, protocol stack and plane desired for the performance required of a particular slice. This provides maximum design freedom for the slicing controller.

Figure 7:
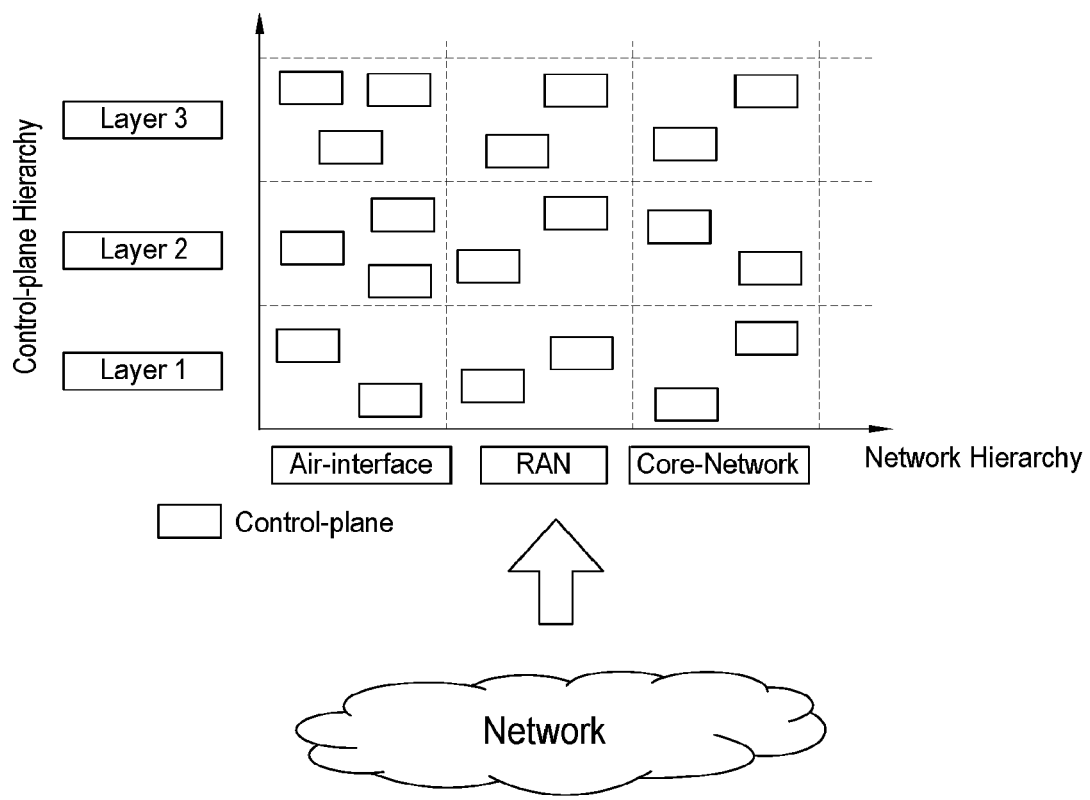
FIG. 7 illustrates a schematic diagram of 2D abstraction of the network in vertical and control-plane domains according to an embodiment.

FIG. 7 shows a 2D abstraction of the network in the control-plane and vertical dimensions. As can be seen the operation of each individual network function is limited/abstracted to a particular part of the hierarchy of the plane (i.e. the control plane in this example but the same abstraction principles also apply to the user plane, as already indicated in FIG. 6) as well as to a particular part of the network hierarchy.

In addition to the functional abstraction of the network, embodiments abstract the air-interface of the underlying network. Such abstraction allows a slice to co-exist with other slices on the air-interface. In case of the 5G network, embodiments abstract the air-interface as a set of sub-frames pertaining to control-plane, user-plane or both. The abstraction of the air-interface also provides the capability of efficiently mapping RAN and core network components of the slice to the air-interface with slice-specific customization. The abstraction of the air-interface can be directly extended to other wireless interfaces in the network. In 4G/5G cellular networks, an air-interface is the main wireless interface. However, other wireless interfaces exist, for example, base stations connecting to the core network over wireless links. In this case, those wireless links also involve resources (depending on the actual wireless technology, e.g., microwave communication). These air-interface resources are also abstracted in the disclosed manner.

Embodiments abstract the whole network (and not just the radio resources). That is, a plurality of network functions are abstracted across the device domain, including the wireless interface, the RAN and the core network. Embodiments abstract the overall network as a set of network functions and implements the unique 4-dimensional (4D) functional abstraction approach. That is, abstract the physical network of entities and interfaces as a set of network functions. This may be achieved through a two-tier function-level decomposition of the network as described above.

Service Composition

By exploiting functional decomposition and abstraction, embodiments provide modular and dynamic service composition functionality as per the requirements of a slice. Service composition exploits abstraction to create a slice (which, in one embodiment, is a service graph). In addition, embodiments adopt an approach to service composition, which is based on chaining of different network functions.

Embodiments provide a method for synthesizing a service through chaining of different network functions. Synthesising of a slice may be carried out by the slicing controller.

Figure 8:
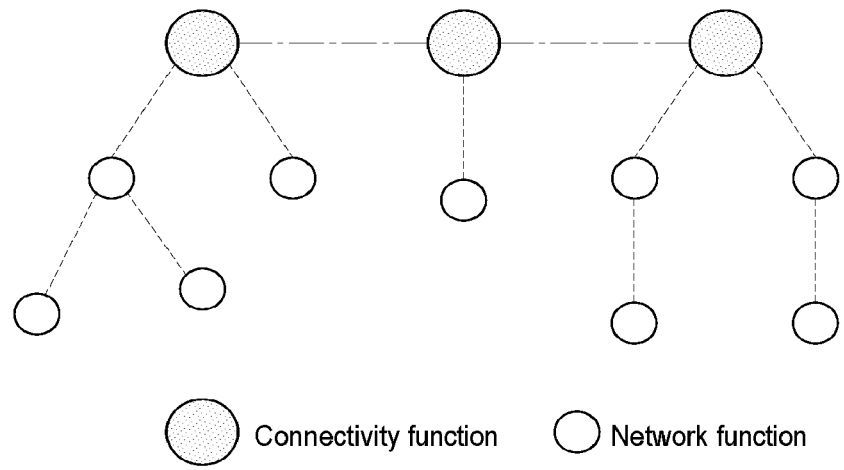
FIG. 8 illustrates a schematic diagram of service composition through service function chain and a directed service graph according to an embodiment.

FIG. 8 illustrates a service composition through service function chain and a directed service graph. A directed graph is a graph in which vertices are connected by edges such that the edges have a direction associated with them, for example, one-way or two-way. In FIGS. 8-14, the directions are not explicitly shown as the information flow is bi-directional, i.e., downlink and uplink. However, scenarios where the information flow in a graph is one-way only exist. FIG. 8 shows Tier 1 connectivity functions (large circles—vertices) and Tier 2 network functions (smaller circles) assigned to the Tier 1 connectivity functions. The connectivity functions may be chained to one another and chained to a plurality of network functions. The chains are shown as lines (which are edges) between the circles (vertices). Thus, there are different communication paths through the network which may be chosen based on the particular requirements.

Figure 9:
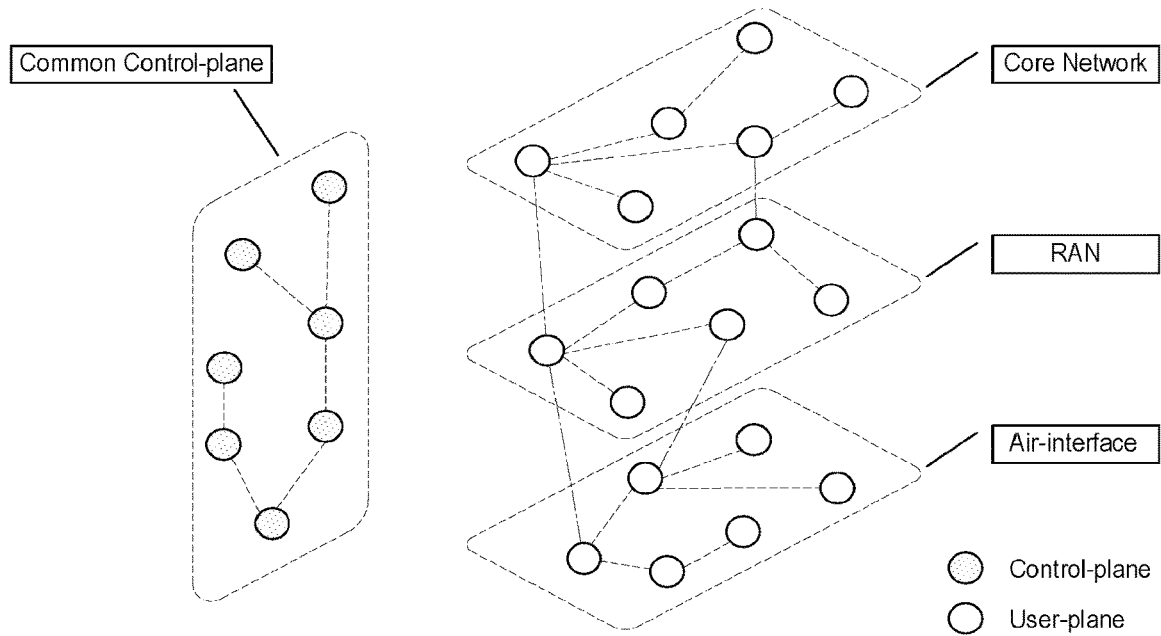
FIG. 9 illustrates a schematic diagram of service composition based on a multi-plane graph according to an embodiment.

FIG. 9 illustrates a service composition based on a multi-plane graph. On the right hand side, there are three domains (Core network, RAN and Air-interface) represented as three layers, which are planes. Each of the domains include Tier 2 functions which may be grouped into particular user-plane functions. In addition, a common control plane may run through different slices, which may have Tier 2 functions grouped into particular control-plane functions. A slice is end-to-end service graph split across different planes. Different slices may have different user-planes. These functions facilitate vertical connections so that end-to-end resource slicing from a device to the core network may be carried out.

Figure 10:
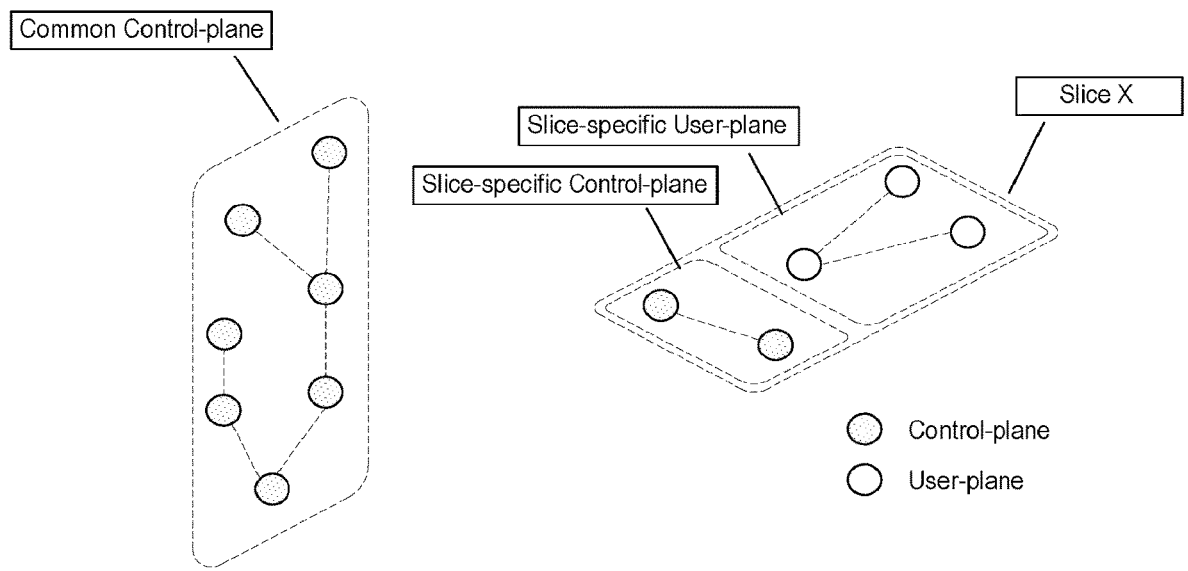
FIG. 10 illustrates a schematic diagram of two-level control-plane design according to an embodiment.

FIG. 10 illustrates a design in which control plane functions are present in a common control plane that is used for signalling control commands for multiple slices or all currently defined slices as is the case in FIG. 9. In addition some of the control plane functionality is performed with a specifically defined slice so that the slice does not only comprise network functions relating to the user plane but additionally also comprises network functions relating to the control plane. The latter network functions are, in one embodiment, used for implementing control signalling that is not universally applicable to all defined slices and that is, instead, specific to the particular slice within which the network functions are provided. The slice indicated in FIG. 10 as "Slice X" may comprise multiple planes, such as a plane relating to different domains (FIG. 9 shows this as planes relating to the core network, the RAN and the air-interface respectively) or to a single domain, say, for example, the RAN.

In one embodiment, service composition for a slice (i.e. synthesising a slice) is based on the union of a service function chain in one dimension and a directed service graph in another dimension. The service function chain comprises basic connectivity functions. These may be applicable to a number of different slices or indeed to all slices presently defined. The directed service graph covers different network functions that may be required by a particular slice. The vertices of the graph represent network functions while the edges represent protocol-level interaction, i.e., control-plane or user-plane.

Figure 11:
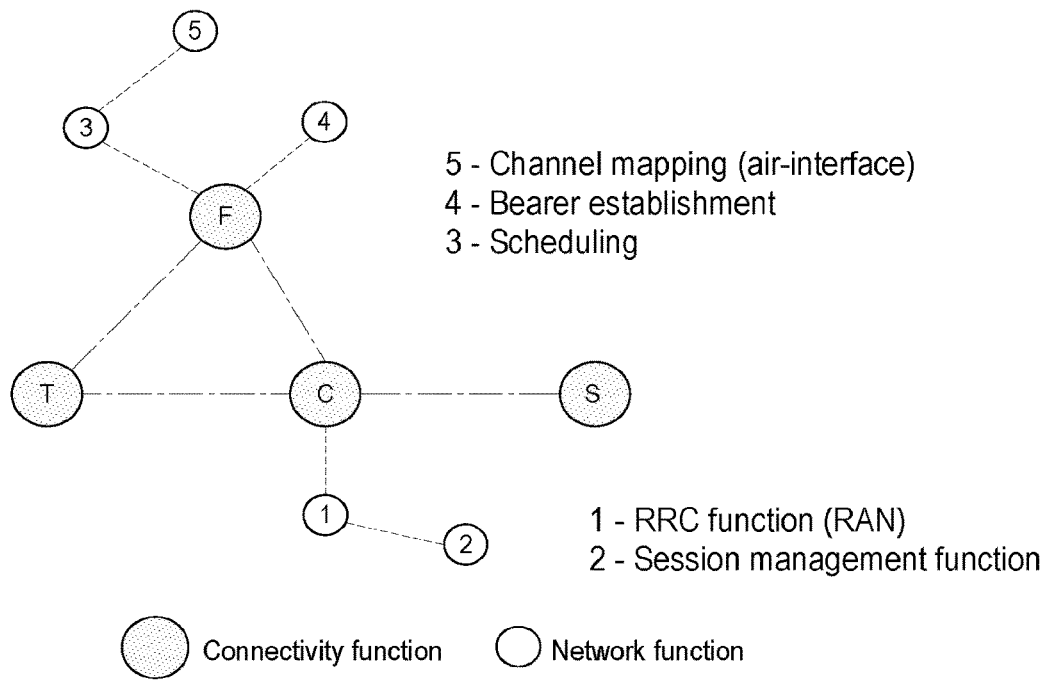
FIG. 11 illustrates a schematic diagram of service composition through service function chain and a directed service graph according to an embodiment.

FIG. 11 illustrates this and shows chaining of four basic connectivity functions: transmission function (T), connection function (C), forwarding function (F), and security function (S). FIG. 11 shows a more specific example of a service composition through service function chain and a directed service graph shown in FIG. 8. There is protocol-level interaction between different basic connectivity functions. For example, the connection function (C) interacts with the transmission function (T) for sending/receiving necessary information for establishing and maintaining a connection between a device and the network.

For some of the basic connectivity functions, there is a directed service graph that captures the network functions for a slice. For example, the forwarding function F comprises scheduling 3, bearer establishment 4 and channel mapping 5 functions to transmit/receive data between a device and the network. The forwarding function F is chained to these Tier 2 functions as shown. Note the protocol-level interaction between channel mapping and scheduling functions. Similarly, the connection function comprises RRC 1 (radio resource control) function for the RAN (radio access network) and session management 2 function for the core network. These Tier 2 functions may be hosted on different protocol stack layers, for example, the scheduling 3 may be on the MAC layer.

In another embodiment, service composition for a slice is based on a multi-plane graph where the number of planes corresponds to the levels of network hierarchy. Such multi-plane service composition provides the flexibility of network function placement based on QoS (quality-of-service) requirements of a slice.

Figure 12:
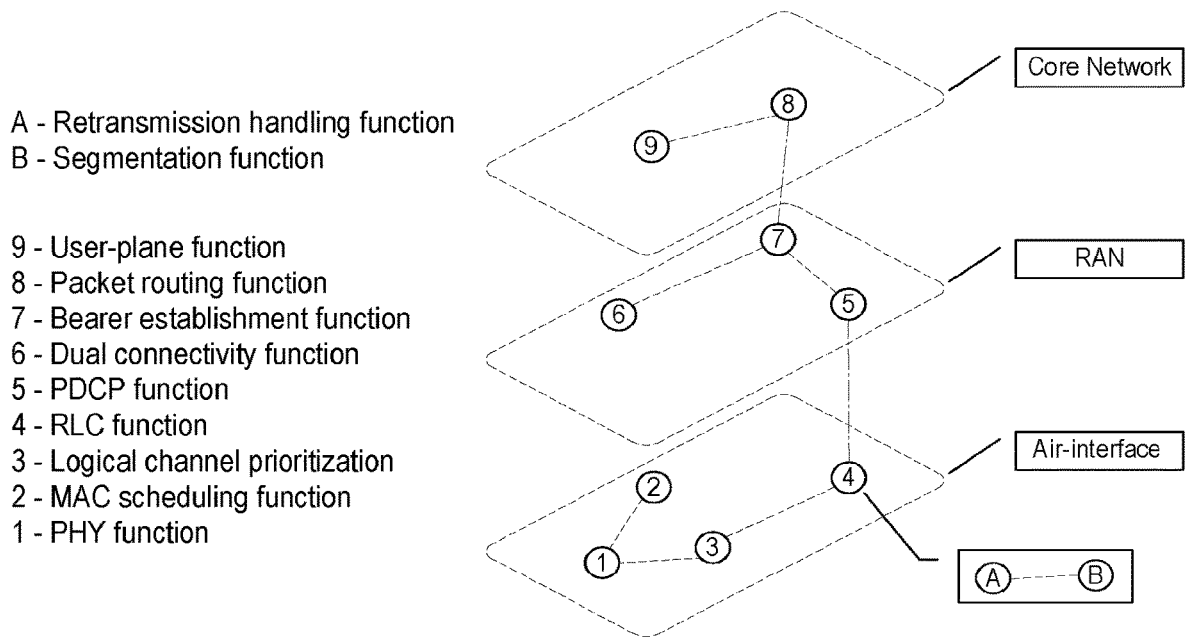
FIG. 12 illustrates a schematic diagram of (user-plane) service composition for a slice based on a multi-plane graph according to an embodiment.

FIG. 12 illustrates this and shows the user-plane service composition or a slice based on a multi-plane graph. FIG. 12 shows a more specific example of a service composition based on a multi-plane graph shown in FIG. 9. In the core network, the service graph comprises at least a packet routing function 8 that serves as the session end-point between a device and the network and a user-plane function 9 to route user-traffic in/out of the core network.

The service graph in the RAN comprises a bearer establishment function 7 for forwarding data between a device and the network, a dual-connectivity function 6 that enables a device to transmit/receive data from two base stations, and a PDCP function 5 that handles PDCP layer functionality. The bearer establishment function 7 is chained to the user-plane function in the core network.

On the air-interface the service graph consists of a PHY (physical) function 1 that handles PHY layer functionality, a MAC (medium access control) scheduling function 2 for allocating radio resources to a device, a logical channel prioritization function 3 that providing channel multiplexing capabilities, and an RLC (radio link control) function 4 that handles RLC layer functionality. The RLC function 4 is chained to the PDCP function 5 in the RAN. As part of a service graph, a network function can be a fine-grained atomic function or a coarse-grained collection of individual functions. For instance, the RLC function 4 in this case comprises a retransmission handling function and a segmentation function (i.e. A and B) only.

Another aspect of service composition is the design of control-plane for user-planes of different slices. Embodiments implement two different control-plane designs. The first design implements a common control-plane for the user-plane of all slices.

Figure 13:
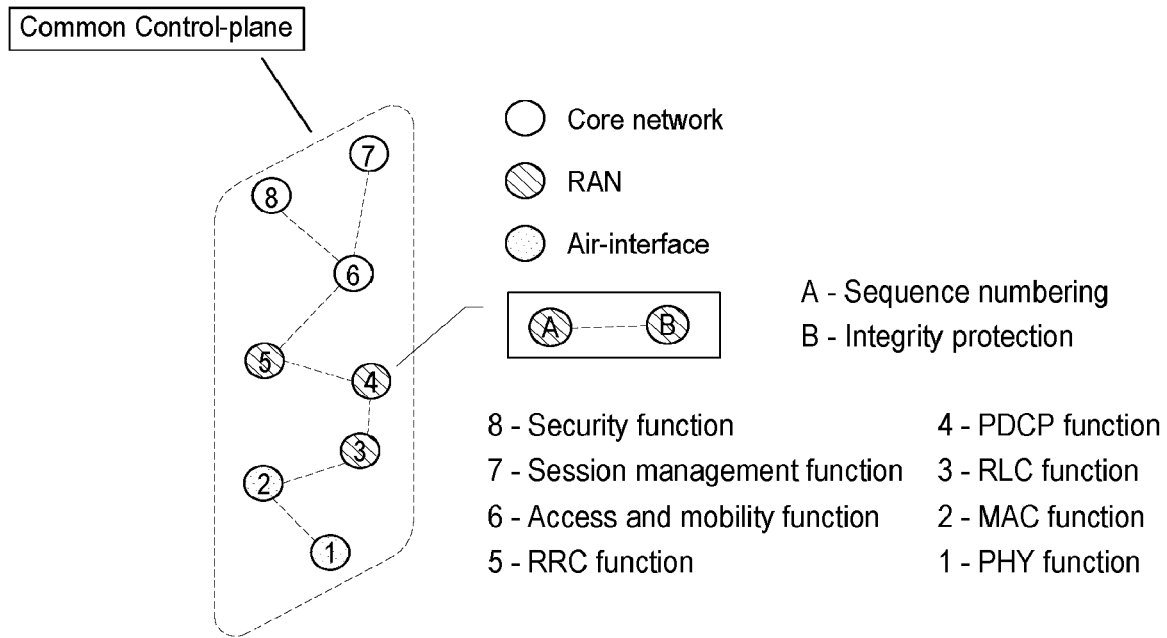
FIG. 13 illustrates a schematic diagram of common control-plane design based on service graph according to an embodiment.

FIG. 13 illustrates this and shows a common control-plane design for a slice. FIG. 13 shows a more specific example of part of a two-level control-plane design shown in FIG. 10. The service graph comprises control-plane functions across the air-interface, the RAN and the core network. The control-plane functions provides control message signalling for different slices. In one embodiment, the service graph is traversed as per the network hierarchy. This means that the network functions are chained up in the order provided by the network hierarchy. In another embodiment, the service graph is traversed as per the protocol stack hierarchy.

Figure 14:
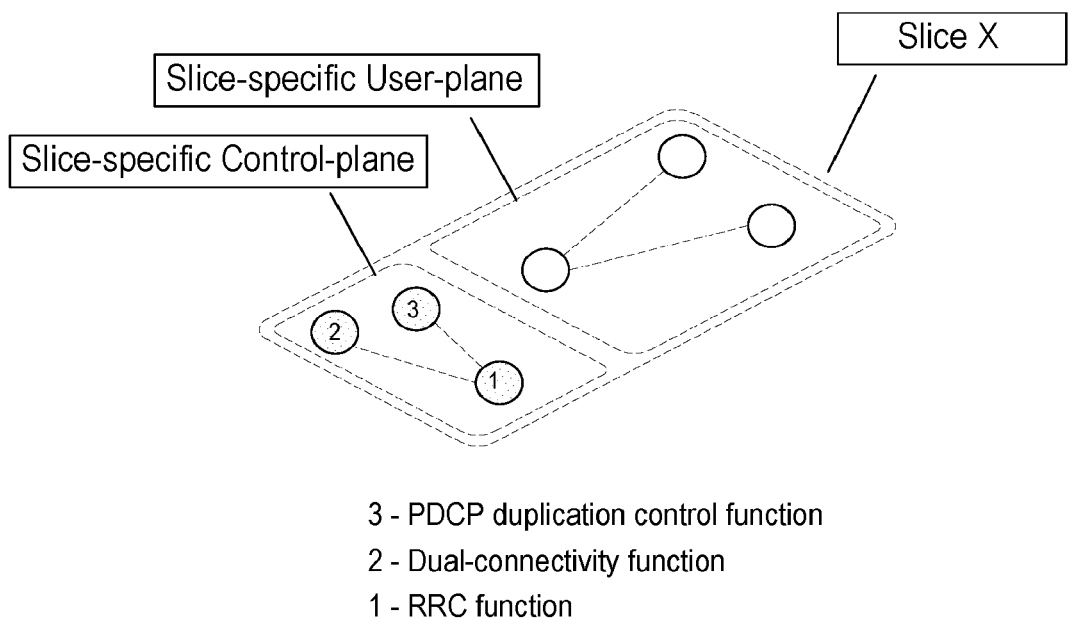
FIG. 14 illustrates a schematic diagram of slice-specific control-plane design according to an embodiment.

A second design shown in FIG. 14 extends the first design by implementing a two-level control-plane such that the first level handles system-level control-plane functions whereas the second level handles slice-specific control-plane functions.

FIG. 14 illustrates the slice-specific part of the control-plane design. FIG. 14 shows a more specific example of part of a two-level control-plane design shown in FIG. 10. Such a two-level control-plane design provides the capability of customized control-plane design as per the requirements of a slice along with efficient utilization of resources across different slices and minimal signalling overhead. Again, the slice may have a slice specific control-plane with customised control-plane functions and a have a slice specific user-plane with customised user-plane functions.

For slices requiring very high reliability, a packet duplication functionality is desirable. This entails sending/receiving data to/from two base stations. Packet duplication and duplicate elimination functionalities are realized at the PDCP (packet data convergence protocol) layer. In this context, the slice-specific control-plane comprises RAN control-plane functions: an RRC (radio resource control) function, a dual-connectivity function, and a PDCP duplication control function. The RRC function interacts with the common control-plane for slice-specific signalling messages. The dual-connectivity function configures a device with dual-connectivity functionality. This entails adding a second base station and configuring appropriate packet routing functionalities. The PDCP duplication control function dynamically activates/de-activates PDCP duplication functionality.

Embodiments implement a modular and dynamic service composition approach, which exploits functional abstraction of the network. Such service composition is customized as per the requirements of an application.

Dynamic Service-to-Resource Mapping

The objective of service-to-resource mapping is to enable efficient co-existence of different slices on the air-interface while providing high resource utilization and function-level isolation. Embodiments adopt an approach to realize such service-to-resource mapping in a dynamic fashion. The proposed approach consists of (i) the aforementioned abstraction of air-interface as a set of sub-frames, (ii) virtualization of radio resources and (iii) a virtual data pipe that maps higher-layer information onto the physical resources.

Virtualization of Radio Resources: Embodiments virtualize (or abstract) radio resources in a way that facilitates allocation of physical resources to different slices based on service requirements. In 4G/5G networks, a resource block is the fundamental resource unit which comprises a fixed number of sub-carriers in the frequency domain and a fixed number of symbols in the time domain. The virtualization or abstraction of the radio resources may be carried out using the slicing controller.

In embodiments the physical resources (resource blocks) are revealed to the slices in the form of virtual resource sets where each set is characterized by a slice-specific QoS (quality-of-service) metric. The virtual resource set consists of one or more virtual resource blocks. In addition to slice-specific virtual resource sets, a virtual resource set is revealed for common control-plane functions.

Figure 15:
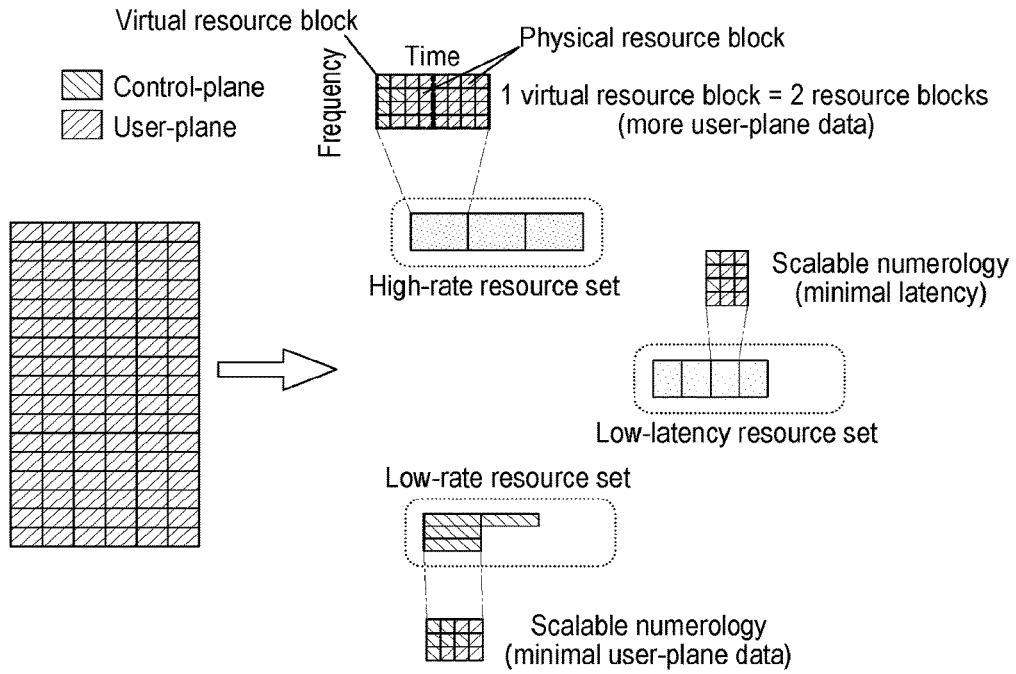
FIG. 15 illustrates a schematic diagram of radio resource virtualization according to an embodiment.

The 17×6 block of radio resources shown on the left of FIG. 15 represents all of the radio resources available for allocation to either the control or the user plane, with the x-axis illustrating available time slots and the y-axis available frequencies/sub-carriers. These radio resources are virtualised in an embodiment with three virtual resource sets: a high-rate resource set suitable for transmission of user data at a high data transmission rate, a low-latency resource set suitable for transmitting user data with low latency and a low-rate resource set. It will be appreciated that these three sets are merely an example of the way in which the total available radio resources can be subdivided into a number of set and that different types of sets may be created to meet different service delivery demands. Each of the sets shown in FIG. 15 has a predetermined grid of sub-carriers and time slots allocated to it. Moreover, within each set various combinations of radio resources are allocated to control plane and user plane data transmission respectively.

The high-rate resource set provides radio resources for high data rate applications like video streaming and maximises the amount of user-data that is transmittable within the set. It consists of one or more high-rate virtual resource blocks such that each virtual resource block comprises one or more physical resource blocks. The slice occupied by the high rate resource set (i.e. the high-rate slice) may be allocated resource only from the high-rate resource set. A physical resource block represents the atomic resource unit which can be allocated to a respective slice user. The physical resource bock comprises a fixed number of symbols in time domain (the x-axis) and a fixed number of sub-carriers in frequency domain (the y-axis). A virtual resource block, which represents the atomic unit for allocation to the respective slice user, is customized as per the requirements of a slice.

For a high-rate slice, a virtual resource block comprises one or more physical resource blocks. In the example shown in FIG. 15, one physical resource block for the high-rate slice equals 4 symbols in time domain and 4 sub-carriers in frequency domain, as indicated by dashed lines in the figure. A physical resource block can carry both user-plane and control-plane information (small squares as shown). Combining multiple physical resource blocks into a single virtual resource block facilitates radio resource allocation for individual slices. In the figure two physical resource blocks together form a virtual resource block. Thus, in the high-rate slice example shown in FIG. 15, two physical resource blocks (4×4) are combined into the one virtual resource block (4×8) shown.

The low-latency resource set provides radio resources for low-latency applications, e.g., industrial control and minimises the amount of transmission latency of the set. It consists of one or more low-latency virtual resource blocks where each virtual resource block is defined as per scalable PHY (physical) layer numerology. A virtual resource block may comprise of one or more physical resource blocks. However, the physical resource blocks for the low-latency slice would be different (i.e., based on scalable numerology) than those used for the high-rate slice. Scalable numerology means that the number of symbols and the number of sub-carriers in a physical resource block can be adjusted as per the requirements. In case of fixed numerology, the size of a physical resource block would be fixed. By adjusting the sub-carrier carrier spacing and symbol duration, lean physical resource blocks are defined for providing minimal latency. Further, such lean physical resource blocks exploit in-resource control signalling where control-plane information is mapped onto a subset of the bandwidth allocated to a resource block.

The low-rate resource set provides radio resources for low data rate applications like industrial monitoring. It comprises one or more low-rate virtual resource blocks where each virtual resource block exploits scalable PHY layer numerology. The virtual resource blocks for the low-rate resource sets are comparable with the virtual blocks of the high-rate resource set but the number of symbols and the number of sub-carriers will be different in the corresponding physical resource block(s). By adjusting the sub-carrier spacing and symbol duration, appropriate length physical resource blocks are defined that maximize resource utilization by carrying maximum amount of control-plane information with sufficient user-plane information. The exact size of a physical resource block is dependent on various factors. For low-rate and low-latency applications, packet size is fixed and may be in the order of few tens of bytes. Besides, there is an upper and a lower bound on the amount of achieved data rate based on the size of a physical resource block. In one embodiment the length is dictated by how much and how frequent the control-plane information needs to be sent in tandem with user-plane information. The low-rate resource set is particularly attractive for transmitting slice-specific control-plane information. The slice specific control information does not have to relate to the slice occupied by the low rate resource set. Instead the control information may be used to control transmission in other slices, such as in the low-latency slice. The low-rate slice is particularly suitable for this purpose as it is designed to send a relatively low amount of user-plane information (i.e. data).

It will be appreciated that the manner in which slicing is carried out (an example of Dynamic Network-wide Slicing is described below) may change from case to case. Important is, however, that the slicing controller does slice into different resource sets, as illustrated in FIG. 15.

Virtual Data Pipe

One component of service-to-resource mapping is a virtual data pipe that maps higher-layer information onto the physical resources. In case of 4G/5G mobile/cellular networks, the virtual data pipe maps Layer 3 (e.g. radio resource control (RRC) in the protocol stack layer; see the top row of FIG. 16) information onto the physical channels (as indicated in the bottom row of FIG. 16). The service-to-resource mapping may be carried out, at least indirectly, using the slicing controller. The service-to-resource mapping may be carried out in one or more base stations.

Figure 16:
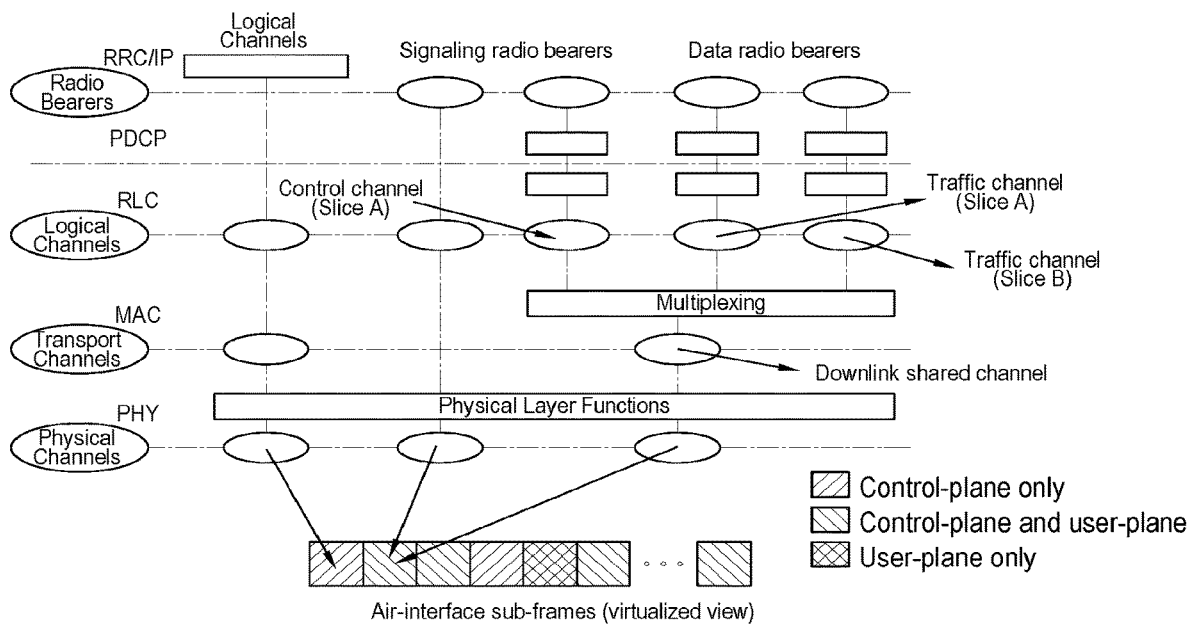
FIG. 16 illustrates a schematic diagram of service-to-resource mapping according to an embodiment.

Embodiments perform such service-to-resource mapping by a two-step approach. The first step is to define slice-specific logical channels which are used to carry control-plane and user-plane messages between the radio link control (RLC) and the medium access control (MAC) layers. The left-most channel shown in FIG. 16, for example is a common control channel that carries control plane information applicable to a number of slices. As is indicted in FIG. 16, not all of the channels need to be associated with a radio bearer, as is the case for the common control channel. Two further logical control channels are illustrated in the second and third channel examples from the left in FIG. 16. The logical channel in the middle of FIG. 16 is slice specific and is consequently treated in the same manner as the slice specific user data channels indicated in FIG. 16 as relating to slices A and B respectively. Embodiments implement a logical channel prioritization algorithm to map slice-specific logical channels to the transport channels that define how and with what type of characteristics the data is transferred to the physical layer. The transport channels themselves are fixed but the mapping of logical channels onto transport channels is optimised by logical channel prioritization.

Transport channels are used to carry control-plane and user-plane messages between the MAC and the Physical (PHY) layer. However, as can be seen from the second logical channel from the left in FIG. 16, it is also possible to map logical channels directly to physical channels. In one embodiment several logical channels can be multiplexed into a single transport channel, as is the case for the logical control (plane) channel in the middle of FIG. 16 and the two user data channels to the right of this control channel.

FIG. 16 illustrates the concept of a virtual data pipe. Protocol stack hierarchy is shown on the y-axis. As shown, logical control (implemented by the two flows for signalling the radio bearers) and traffic channels (implemented by the two flows for the data radio bearers) are defined for different slices. The data is coming from radio bearers, the data needing to be transferred over the air-interface. Logical control channels are for carrying signalling information and logical traffic channels are for carrying data traffic. These channels are multiplexed onto different transport channels based on the logical channel prioritization algorithm (discussed later). The transport channels are further mapped to physical channels.

Physical Channel to Sub-frame Pairing: In the second step, by exploiting the air-interface abstraction described above with reference to FIGS. 6 and 7, embodiments pair the physical channels to the air-interface sub-frames. The physical channels carry user-plane and control-plane messages from the MAC layer.

FIG. 16 also illustrates this and different types of air-interface frames have been defined: control-plane only, user-plane only, and control-plane and user-plane. The common control-plane information is mapped to the control-plane only sub-frame. Other physical channels carrying slice-specific control-plane information and user-plane information are mapped to control-plane and user-plane sub-frames. Although not shown in FIG. 15, it is possible that some of the physical resource blocks only carry user-plane information. Therefore, it is possible to have user-plane only sub-frames in a frame.

In one embodiment, the pairing of physical channels is dictated by the type of information carried by the physical channel. A physical channel carrying data from a low-latency slice has priority. Therefore, it is mapped onto the earliest possible sub-frame.

Logical Channel Prioritization

Figure 17:
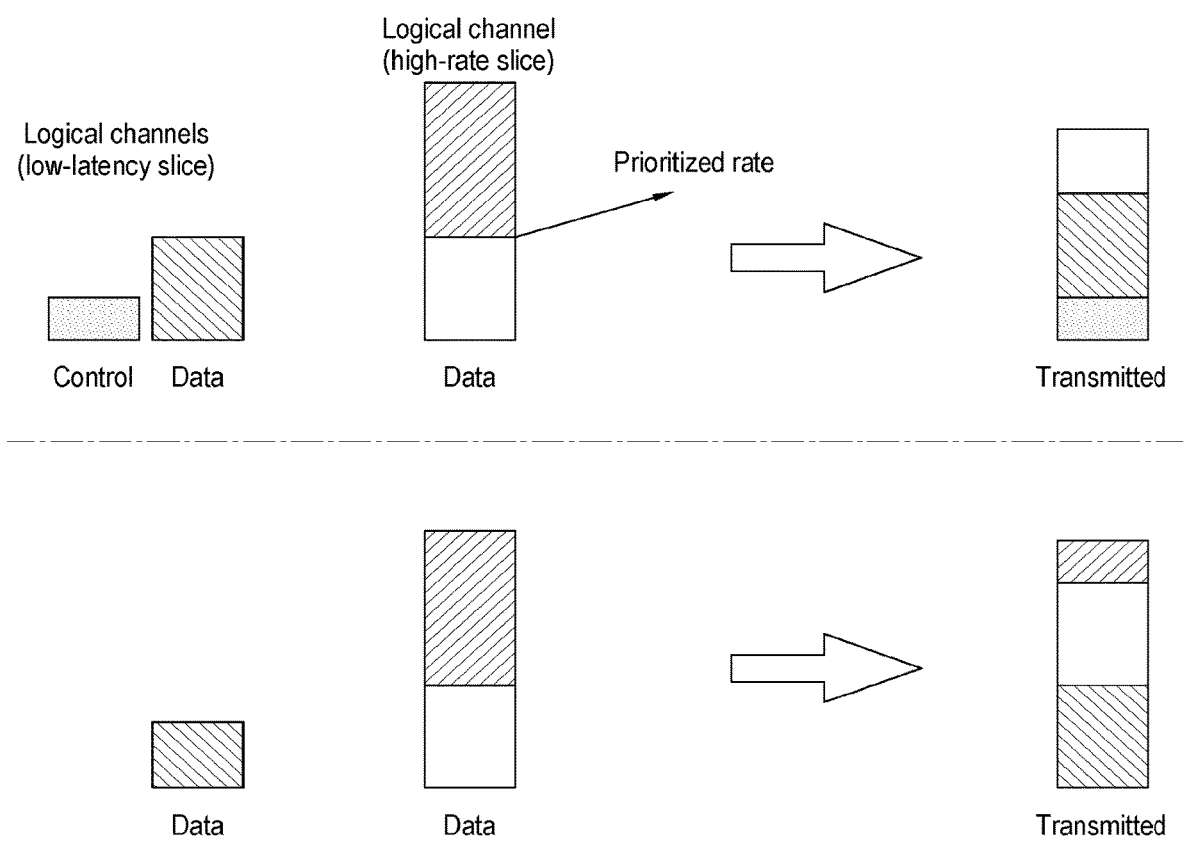
FIG. 17 illustrates a schematic diagram of logical channel prioritization for service-to-resource mapping according to an embodiment.

FIG. 17 illustrates the logical channel prioritization algorithm in embodiments with two slices: a low-latency slice and a high-rate slice. Embodiments prioritize logical channels in a certain manner. The low-latency slice has priority over the high-rate slice.

In one scenario, the low-latency slice has two logical channels: one for slice-specific control-plane information and the other for user-plane information. To avoid starvation of the high-rate slice, a prioritized rate is also defined in addition to the priority value. The prioritized rate is the data rate provided to one logical channel before allocating any resource to a lower-priority logical channel. No prioritized rate is defined for low-latency slices as low latency slices may contain critical control information with bounded latency constraints. By only assigning prioritized rates to high-rate slices transmission of such control information is not delayed or compromised. The logical channels are served in the decreasing order of priority unless the transport block capacity is exhausted or the buffer is empty. The high-rate slice, which has a lower priority, is served up to the prioritized rate. The prioritized rate is the data rate provided to one logical channel before allocating any resource to a lower-priority logical channel.

In order to take into account both the prioritized rate and the priority, each logical channel is served in decreasing order of priority, but the amount of data from each logical channel included into the transport channel is initially limited to the amount corresponding to the configured prioritized rate. Only when all logical channels have been served up to their prioritized rate, if there is still room left in the transport channel, each logical channel is served again in decreasing order of priority. In another scenario, the low-latency slice has a single logical channel. As before, the logical channels are served in decreasing order of priority. Unlike the previous case, data beyond prioritized rate is also incorporated in the transmitted information.

Note that the different aspects of service-to-resource mapping, as discussed above, are applicable to both downlink and uplink.

The service-to-resource mapping involves including slice-oriented virtualization of radio resources, a virtual data pipe and pairing of physical channels onto the air-interface.

Figure 18:
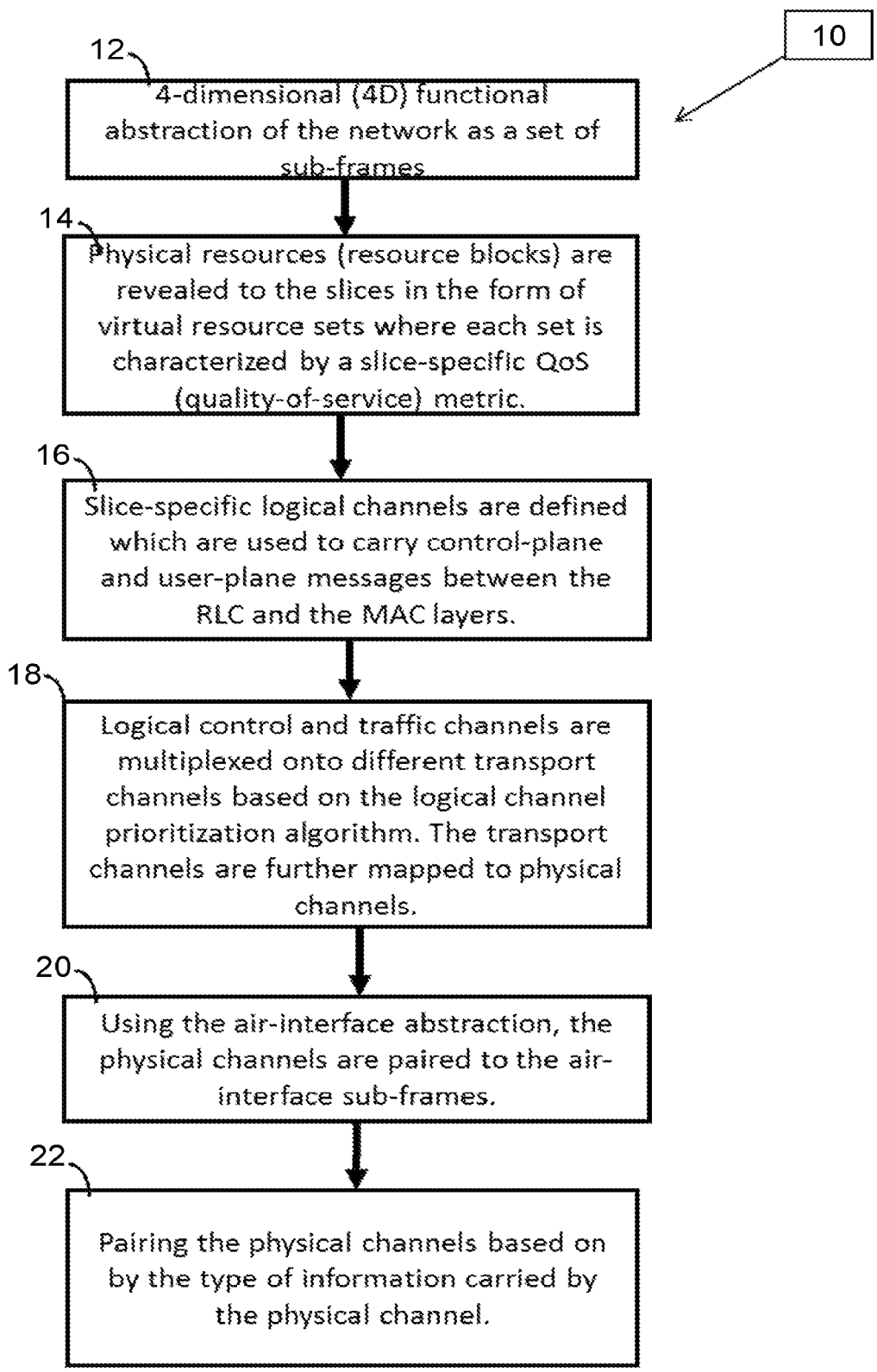
FIG. 18 is a flow diagram of a method of service-to-resource mapping according to an embodiment.

FIG. 18 shows a method 10 of an embodiment of service-to-resource mapping. In step 12 of the method 10, the slice controller carries out a 4-dimensional (4D) functional abstraction of the network as a set of sub-frames, e.g. vertical (hierarchical) domain, horizontal domain, user-plane domain and control plane domain.

In step 14, physical resources (resource blocks) are revealed to the slices in the form of virtual resource sets where each set is characterized by a slice-specific QoS (quality-of-service) metric. That is, radio resources are virtualized (or abstracted) in a way that facilitates allocation of physical resources to different slices based on service requirements.

In step 16, slice-specific logical channels are defined which are used to carry control-plane and user-plane messages between the RLC and the MAC layers. Then, in step 18, logical control and traffic channels are multiplexed onto different transport channels based on the logical channel prioritization algorithm. The transport channels are further mapped to physical channels.

In step 20, using the air-interface abstraction, the physical channels are paired to the air-interface sub-frames. In step 22, the physical channels are paired based the type of information carried by the physical channel.

The method enables efficient co-existence of different slices on the air-interface while providing high resource utilization and function-level isolation.

Dynamic Network-wide Slicing

Embodiments have been designed to provide network-wide connectivity. In a private 4G/5G network, embodiments provide end-to-end resource slicing across the whole network, potentially comprising multiple base stations. However, the traffic distribution across different base stations may not remain static, particularly in large-scale networks.

In one embodiment, the slicing controller updates radio resource allocation for each slice based on feedback from the base stations. One solution is where the slicing controller exploits periodic feedback (on relatively coarse-grained timescale as compared to the timescale for radio resource scheduling decisions) from base stations which is translated into slice utility and/or slice utilization metrics. The slicing controller periodically updates the slice allocation factor for a slice which defines the fraction of radio resource allocated to the virtual resource set for a slice.

One key difference between embodiments and previous slicing techniques, in the context of radio resource virtualization, is that the previous slicing techniques may abstract radio resources in only 3 dimensions: frequency dimension, time dimension and spatial (base station) dimension whereas embodiments virtualizes radio resources into slice-specific resource pools with virtual resource blocks defined as per slice requirements.

Embodiments also provide an API (application programming interface) to the service provider or the network owner to customize the requirements of a slice. In another embodiment, the slicing controller performs a service re-composition operation for a slice if its requirements are changed. This is achieved by updating the service graph for a slice.

Whilst certain embodiments have been described, these embodiments have been presented by way of example only, and are not intended to limit the scope of the inventions. Indeed, the novel devices, and methods described herein may be embodied in a variety of other forms; furthermore, various omissions, substitutions and changes in the form of the devices, methods and products described herein may be made without departing from the spirit of the inventions. The accompanying claims and their equivalents are intended to cover such forms or modifications as would fall within the scope and spirit of the inventions.

The invention claimed is:

1. A method of resource slicing in a wireless communication network comprising a device domain, a radio access network and a core network, wherein the device domain comprises at least one device and is connected to the radio access network over a wireless interface, the radio access network comprises at least one base station, the core network comprises a plurality of components connected by a wired interface, and the core network uses the radio access network to connect to the at least one device, the method comprising:
  abstracting, by using a slicing controller, the device domain, the radio access network and the core network as a plurality of network functions to provide end-to-end resource slicing across the at least two of the device domain, the radio access network and the core network, the end-to-end resource slicing being carried out from the at least one device to the core network; and
  interacting, by using the slicing controller, with the radio access network and the core network through two-way communication over application programming interfaces,
  wherein the network functions provide protocol functionality as part of connectivity in the wireless communication network, and the end-to-end resource slicing is logically achieved in an entity located at a higher level in network hierarchy as compared to the at least one of base stations or access points in the radio access network.

2. The method of claim 1, further comprising decomposing a network entity or a network domain into the network functions by identifying coarsely-grained basic connectivity functions and then splitting the basic connectivity functions into more finely-grained network functions.

3. The method of claim 2, further comprising grouping the fine-grained network functions into control-plane and user-plane functions.

4. The method of claim 1, further comprising abstracting the wireless communication network into a hierarchy of the network functions in a plurality of dimensions.

5. The method of claim 4, further comprising abstracting the wireless communication network into a vertical dimension from the device to the core network or vice versa, and/or abstracting the wireless communication network in a horizontal dimension, across layers of network hierarchy, by traversing layers of protocol stack hierarchy.

6. The method of claim 1, further comprising synthesizing a slice by selecting and chaining of the plurality of network functions based on service requirements.

7. The method of claim 1, further comprising synthesizing a slice through chaining of basic connectivity functions in one of a vertical dimension, a horizontal dimension, a control-plane dimension or a user-plane dimension and a directed graph of network functions in a different one of the vertical dimension, the horizontal dimension, the control-plane dimension or the user-plane dimension, wherein the connectivity between basic connectivity functions and the vertices of a directed graph is dictated by protocol-level interaction.

8. The method of claim 1, further comprising at least one of:
  synthesizing a slice through a multi-plane graph, wherein each plane corresponds to a level of network hierarchy; or
  synthesizing a slice through a multi-plane graph, wherein each plane corresponds to a level of network hierarchy and synthesizing a slice through a directed graph of network functions in a wireless interface, the radio access network and the core network.

9. The method of claim 8, further comprising synthesizing a common control-plane for all slices of the wireless communication network such that the directed graph comprises control-plane functions in the wireless interface, the radio access network and the core network, and the graph is traversed as per the hierarchy of the wireless communication network or the protocol stack hierarchy.

10. The method of claim 9, further comprising synthesizing the control-plane to provide slice-specific control-plane functionality.

11. The method of claim 1, further comprising abstracting physical radio resources defined in time and frequency domains such that the physical resources are grouped into resource sets, wherein each resource set is based on slice-specific service requirements and/or service requirements that extend across slices.

12. The method of claim 11, further comprising synthesizing the one or more resource sets through adaptation of time and frequency domain resources to serve an application that requires maximised user-data throughput, an application that requires minimising transmission latency or an application that can afford a low user-data transmission rate.

13. The method of claim 1, further comprising mapping a slice over the wireless interface through a virtual data pipe such that the virtual data pipe represents the end points for data transfer between the device and the radio access network, defining slice-specific logical channels and mapping the slice-specific logical channels onto one or more transport channels and further mapping the transport channels onto physical channels.

14. The method of claim 1, wherein the abstracting abstracts the wireless communication network as the network functions in addition to abstract wireless resources.

15. The method of claim 1, wherein the slicing controller is further configured to slice into different resource sets.

16. The method of claim 1, wherein the slicing controller is further configured to perform a service re-composition operation for a slice if requirements of the slice are changed.

17. A wireless communication network comprising:
  a device domain comprising at least one device;

a radio access network comprising at least one base station;

a core network comprising a plurality of components connected by a wired interface, wherein the device domain is connected to the radio access network over a wireless interface, and the core network uses the radio access network to connect to the at least one device and a slicing controller, wherein the slicing controller is configured to:

abstract the device domain, the radio access network and the core network as a plurality of network functions to provide end-to-end resource slicing across at least two of the device domain, the radio access network and the core network, the end-to-end resource slicing being carried out from the at least one device to the core network; and interact with the radio access network and the core network through two-way communication over application programming interfaces, wherein the network functions provide protocol functionality as part of connectivity in the wireless communication network, and the end-to-end resource slicing is logically achieved in an entity located at a higher level in network hierarchy as compared to the at least one of base stations or access points in the radio access network.

18. The wireless communication network of claim 17, wherein the slicing controller is further configured to synthesize a slice through chaining of basic connectivity functions in one of a vertical dimension, a horizontal dimension, a control-plane dimension or a user-plane dimension and a directed graph of network functions in a different one of the vertical dimension, the horizontal dimension, the control-plane dimension or the user-plane dimension, wherein the connectivity between basic connectivity functions and the vertices of a directed graph is dictated by protocol-level interaction.

* * * * *